United States Patent [19]

Sozzi

[11] 4,156,018

[45] May 22, 1979

[54] PREPARATION OF A POWDERED CHEESE PRODUCT

[75] Inventor: Tomaso Sozzi, Lausanne, Switzerland

[73] Assignee: Societe d'Assistance Technique pour Produits Nestle S.A., Lausanne, Switzerland

[21] Appl. No.: 876,511

[22] Filed: Feb. 9, 1978

Related U.S. Application Data

[63] Continuation of Ser. No. 694,318, Jun. 9, 1976, abandoned.

[51] Int. Cl.$^2$ .................. A23C 19/00; A23C 19/12
[52] U.S. Cl. ................................ 426/36; 426/582; 426/471
[58] Field of Search ............... 426/36, 39, 40, 582, 426/471

[56] References Cited

U.S. PATENT DOCUMENTS

| | | | |
|---|---|---|---|
| 3,128,192 | 4/1964 | Vakaleris | 426/40 |
| 3,502,481 | 3/1970 | Schaap et al. | 426/582 |
| 4,020,186 | 4/1977 | Edwards | 426/36 |

OTHER PUBLICATIONS

Ernstrom C. A., Mechanized "Pizza Cheese" Making Manufactured Milk Products Journal, vol. 57, No. 7, 1965 (pp. 7-8).

Kosikowski, F., Cheese and Fermented Milk Foods, Published by the Author, Cornell University, Ithaca, N.Y., 1966 (pp. 153-155, 158, 162-167, 283, 295 & 296).

*Primary Examiner*—David M. Naff
*Attorney, Agent, or Firm*—Watson, Leavenworth, Kelton & Taggart

[57] ABSTRACT

A process for the production of a cheese in powder form which, after reconstitution, has the properties of mozzarella or of a cheese for souffles, which comprises inoculating a colloidal solution having at least partly the composition of a skimmed milk with a lactic ferment, allowing the solution to ferment under aerobic conditions until its pH falls to a value of from about 4.8 to 5.2, heating the fermented solution to obtain curds and serum, separating the curds from the serum, adding to the curds approximately 5 to 50% by weight, based on dry matter, of fats while adjusting the pH of the mixture if necessary to a value of from about 5.1 to 5.7, and drying the mixture obtained.

4 Claims, No Drawings

PREPARATION OF A POWDERED CHEESE PRODUCT

This is a continuation of application Ser. No. 694,318, filed June 9, 1976, now abandoned.

This invention relates to a process for the production of a cheese in powder form which, after reconstitution, has the properties of mozzarella or of a cheese for souffles.

The fact that a stable product containing all the ingredients required for making a pizza, including cheese, is virtually impossible to obtain on the market shows just how difficult it is to provide for public consumption a cheese in powder form of which the taste, appearance and properties after reconstitution are those of mozzarella. One known process for the production of cheese in powder form comprises grinding a cheese, mixing it with an aqueous solution of an emulsifier and then heating and mixing the resulting product to form a homogeneous creamy mass which is spray dried. This technique is derived from the technique for producing processed cheeses for spreading. Another known process comprises mixing skimmed milk, vegetable oil or butter oil, non-fat milk solids, an emulsifier and a little cheese as a natural source of bacteria, enzymes and flavours, homogenising the resulting mixture, inoculating it with a lactic ferment and leaving it to ferment for a few hours, followed by spray drying. This process is used for the production of quick-maturing cheese. It is not possible by either of these two processes to produce a cheese in powder form which, after reconstitution, has the properties of mozzarella. However, there are processes for producing a stable form of this extruded cheese which is so important for domestic use and for the preparation of commercial products such as pizza. In one of these processes, mozzarella is passed through an extruder and the noodle issuing from the extruder is dried in air. In another process, mozzarella is ground in the presence of liquid nitrogen and the frozen grains are dried in air. Finally, there is also a process for producing a substitute for mozzarella, in which an aqueous dispersion of sodium caseinate and butter fat is inoculated with *Streptococcus lactis,* followed by inoculation with *Micrococcus cascolyticus,* after which the mass is left to ferment under aerobic conditions for a few days and is then acidified and dried, for example by centrifuging, which gives an elastic, plastic product capable of replacing mozzarella. If it is desired to obtain a product in powder form, the fermented acidified dispersion is spray dried.

The present invention is the outcome of a search for a simple, economic process for producing a mozzarella substitute in powder form.

The present invention provides a process for the production of a cheese in powder form which, after reconstitution, has the properties of mozzarella or of a cheese for souffles, which comprises inoculating a colloidal solution having at least partly the composition of a skimmed milk with a lactic ferment, allowing the solution to ferment under aerobic conditions until its pH falls to a value of from about 4.8 to 5.2, heating the fermented solution to obtain curds and serum, separating the curds from the serum adding to the curds approximately 5 to 50% by weight, based on dry matter, of fats while adjusting the pH of the mixture if necessary to a value of from about 5.1 to 5.7, and drying the mixture obtained.

It is preferred to adjust the pH of the mixture to a value of from 5.4 to 5.7 if it is desired to obtain a powder which is particularly suitable for use in the preparation of cheese souffles. Otherwise it is of advantage to adjust the pH of the mixture, if necessary to a value of from 5.1 to 5.3.

The product thus obtained keeps particularly well and, after reconstitution, has a delicate milky taste, a creamy paste-like consistency and properties of cohesion which are so reminiscent of as to be mistaken for those of mozzarella.

The starting material used for carrying out the process according to the invention may be milk, skimmed milk, milk powder or skimmed milk powder, either as such or enriched with proteins of vegetable or microbial origin for example. In the case of a powder, it is obvious that it will be dispersed in water to form the colloidal solution.

The colloidal solution may be pasteurized and cooled to a temperature favourable to the development of the lactic microorganisms used. This may be followed by inoculation with a lactic ferment, such as a culture of *Streptococcus (Str.) thermophilus, Str. lactis, Str. cremoris, Str. diacetylactis, Lactobacillus (L.) helveticus, L. bulgaricus, L. lactis, L. casei, L. brevis, L. plantarum, Leuconostoc (Leu.) citrovorum, Leu. lactis, Leu. cremoris,* or a mixture of such cultures for example.

Acidification may be carried out either in batches or continuously. In the first case, the pH of the incubated solution may be allowed to fall to the desired value in an incubation vat. Thereafter the vat may be evacuated in a single operation. In the second case, solution to be acidified may be added to the incubation vat provided that acidified solution is run off without changing the pH which is kept at the required value. Acidification may also be carried out in two stages, for example by connecting two vats in series, the pH of one being kept at a value of from about 5.6 to 6 and the pH of the other being kept at the required value in the range from about 4.8 to 5.2.

The acidified solution may be coagulated to give grains of curds and a serum by heating it to a temperature of from 40° C. to 70° C. either in a heating chamber equipped with a stirrer or in an adequate tube for example. The grains of curds may then be separated from the serum, for example by filtration or by centrifuging. The fats subsequently mixed with the grains of curds in a quantity of approximately 5 to 50% and preferably in a quantity of approximately 35 to 45% by weight, based on dry matter, may be for example cream, butter oil, a vegetable oil or an animal fat.

If the pH at which acidification is stopped is below the pH at which it is intended to keep the mixture of curds and fats, the pH of the mixture may be adjusted to the required value by the addition of an edible alkali, such as sodium hydroxide for example.

The mixture may then be seasoned with cooking salt, homogenised and, finally, dried in any adequate known manner, for example by spray drying.

The invention is illustrated by the following Examples.

EXAMPLE 1

1000 liters of skimmed milk are pasteurised for 15 s at 72° C. After cooling to 40° C., the pasteurised skimmed milk is introduced into a 1600 liter capacity vat where it is kept at 40° C. This is followed by inoculation with a culture of *Streptococcus thermophilus.* After incubation for 2.5 hours, the pH has fallen to 4.9. Thereafter the acidified milk is continuously run off from the vat at a rate of 1000 l/h, and the conditions prevailing in the vat are maintained by adding to it at the same rate milk which has been pasteurised for 15 seconds at 72° C. and cooled to 40° C. The acidified milk run off is heated to 60° C. and is circulated under turbulent conditions through a dwell tube where the grains of curds are formed. The grains of curds are separated from the serum by centrifuging and are thoroughly mixed with 40% by weight, based on dry matter, of butter oil. The pH of the mixture is adjusted to 5.2 by the addition of sodium hydroxide. Cooking salt is then added. The mixture is homogenised and dried by spray drying. A powder with the following composition (in % by weight) is obtained:

- total nitrogen — 7.9
- fats — 41
- lactose — 5
- ash — 2.5
- cooking salt — 1.1
- water — 2
- proteins approx. — 50

If this powder is rehydrated with various quantities of water of from 40% to 60% by weight, followed by heating to various temperatures of from 50° C. to 80° C., a pasty mass so resembling as to be mistaken for mozzarella is obtained on each occasion.

If the powder is hydrated without being heated and if a pizza is made from the mass obtained, the mass has the appearance, texture and taste of traditional mozzarella on removal from the oven.

EXAMPLE 2

The procedure is the same as in Example 1 except that a mixture of cultures of *Streptococcus lactis* and *Str. cremoris* is used for inoculation instead of *Str. thermophilus*, and incubation is carried out at 32° C. as opposed to 40° C.

A powder is obtained which has the same characteristics of the powder obtained in Example 1.

EXAMPLE 3

The procedure is as in Example 1, except that acidification is stopped when the pH reaches 4.9 and the entire batch is subjected to the treatment described. The same powder as that described in Example 1 is obtained.

EXAMPLE 4

The procedure is as in Example 1 except that 36% of soya oil instead of 40% of butter oil are mixed with the grains of curd. A powder with the following composition (in % by weight) is obtained:

- total nitrogen — 8.1
- fats — 37
- lactose — 6
- ash — 3
- cooking salt — 1
- water — 3
- proteins approx. — 50

After reconstitution, the powder has the same properties as the powder of Example 1.

EXAMPLE 5

The procedure is as in Example 1, except that the pH of the mixture of curds and butter oil is adjusted to 5.6 as opposed to 5.2.

A powder with the following composition (in % by weight) is obtained:

- total nitrogen — 7.8
- fats — 41
- lactose — 4
- ash — 4
- cooking salt — 1
- water — 2
- proteins approx. — 50

If this powder is rehydrated and if the mass obtained is used for making a souffle, the mass shows, after cooking, a pleasant, light and appetising texture which is even better than that which can be obtained with a traditional cheese.

We claim:

1. A process for the production of a cheese in powder form which, after reconstitution with 40 to 60% by weight of water and heating to 50° to 80° C., has the properties of heated mozzarella, which comprises inoculating a colloidal solution consisting essentially of a skimmed milk or a reconstituted skimmed milk powder with a lactic ferment containing lactic acid producing Streptococcus bacteria, allowing the solution to ferment under aerobic conditions until its pH falls to a value of from about 4.8 to 5.2, heating the fermented solution to 40° to 70° C. under turbulent conditions to obtain curds and serum, separating the curds from the serum, mixing with the curds approximately 35 to 45% by weight, based on dry matter, of fats, the pH of the mixture being maintained at a value of from about 5.1 to 5.3, adding cooking salt, homogenizing and spray drying the mixture to obtain a powder form thereof.

2. A process as claimed in claim 1, wherein the fat is butter oil.

3. A process as claimed in claim 1, wherein the fat is soya oil.

4. A cheese in powder form produced in accordance with the process of claim 1.

* * * * *